(12) United States Patent
Mu

(10) Patent No.: US 11,950,292 B2
(45) Date of Patent: Apr. 2, 2024

(54) DATA TRANSMISSION METHOD AND APPARATUS BASED ON TIMING ADVANCE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 348 days.

(21) Appl. No.: 17/290,978

(22) PCT Filed: Nov. 2, 2018

(86) PCT No.: PCT/CN2018/113710
§ 371 (c)(1),
(2) Date: May 3, 2021

(87) PCT Pub. No.: WO2020/087505
PCT Pub. Date: May 7, 2020

(65) Prior Publication Data
US 2022/0039169 A1    Feb. 3, 2022

(51) Int. Cl.
*H04W 4/00*        (2018.01)
*H04W 56/00*       (2009.01)
*H04W 74/00*       (2009.01)
*H04W 74/0833*     (2024.01)

(52) U.S. Cl.
CPC ... *H04W 74/0833* (2013.01); *H04W 56/0045* (2013.01); *H04W 74/002* (2013.01)

(58) Field of Classification Search
CPC ............. H04W 56/0045; H04W 74/00; H04W 74/002; H04W 74/08; H04W 74/0833
See application file for complete search history.

(56) References Cited

U.S. PATENT DOCUMENTS

| 11,139,928 B2* | 10/2021 | Jechoux ................. H04W 72/23 |
| 2010/0080155 A1* | 4/2010 | Suzuki .................... H04W 4/20 370/310 |
| 2013/0100938 A1 | 4/2013 | Kwon et al. |
| 2014/0341014 A1 | 11/2014 | Kim et al. |
| 2017/0142708 A1 | 5/2017 | Ho et al. |
| 2017/0347329 A1 | 11/2017 | Parkvall et al. |

(Continued)

FOREIGN PATENT DOCUMENTS

| CN | 102932837 A | 2/2013 |
| CN | 107708205 A | 2/2018 |

(Continued)

OTHER PUBLICATIONS

Extended European Search Report issued in Application No. 189385583.4, dated May 18, 2022,(10p).

(Continued)

*Primary Examiner* — Chi H Pham
*Assistant Examiner* — Elisabeth Benoit Magloire
(74) *Attorney, Agent, or Firm* — Arch & Lake LLP

(57) ABSTRACT

A method and apparatus for data transmission are provided. The method is applied to a user equipment that detects a current timing advance (TA) in a target time unit to obtain a detection result. The user equipment sends, if the detection result indicates that the current TA has expired, at least one of a random access signal and a target notification message to a base station.

20 Claims, 11 Drawing Sheets

(56) References Cited

U.S. PATENT DOCUMENTS

| | | | |
|---|---|---|---|
| 2018/0049079 A1* | 2/2018 | Ozturk | H04W 72/0453 |
| 2018/0098360 A1 | 4/2018 | Vos et al. | |
| 2018/0139774 A1* | 5/2018 | Ma | H04L 1/189 |
| 2018/0206262 A1* | 7/2018 | Cao | H04W 72/1268 |
| 2018/0317221 A1 | 11/2018 | Yasukawa et al. | |

FOREIGN PATENT DOCUMENTS

| | | | | |
|---|---|---|---|---|
| CN | 108353406 A | 7/2018 | | |
| CN | 108574983 A | 9/2018 | | |
| CN | 108633086 A | 10/2018 | | |
| EP | 2640138 A1 | 9/2013 | | |
| EP | 2742717 A1 | 6/2014 | | |
| EP | 3592037 B1 * | 5/2021 | ............ | H04W 12/04 |
| WO | 2011085678 A1 | 7/2011 | | |

OTHER PUBLICATIONS

NOA of Application No. 202127021681 dated on May 25, 2022 with English translation, (6p).
International Search Report issued in PCT/CN2018/113710, dated Aug. 8, 2019 with English translation, (4p).
India OA issued in Application No. 202127021681 dated Jan. 2, 2024,(3p).

* cited by examiner

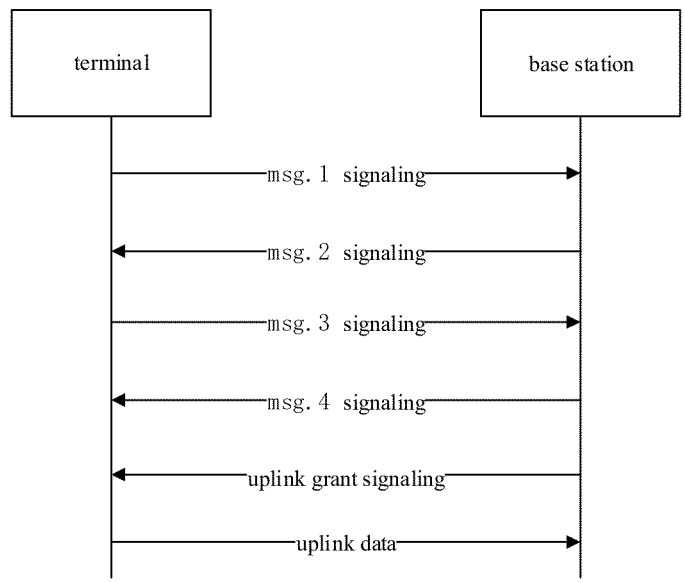
Fig. 1A - Prior Art
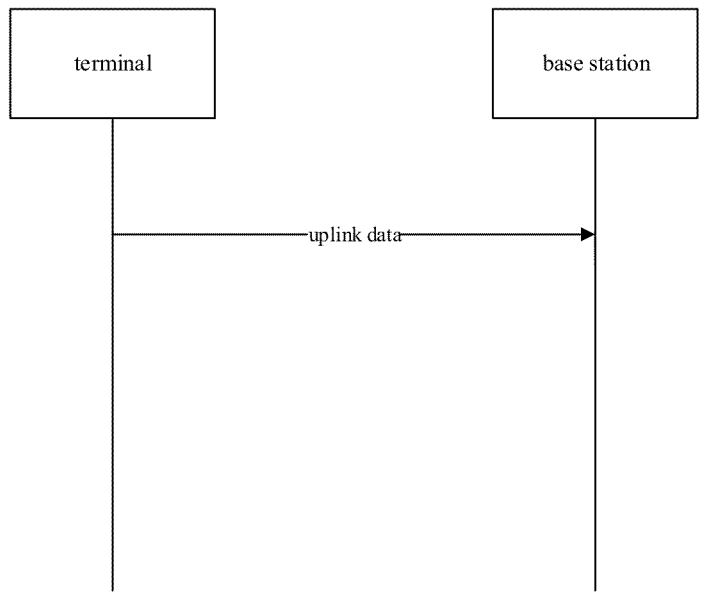
Fig. 1B - Prior Art
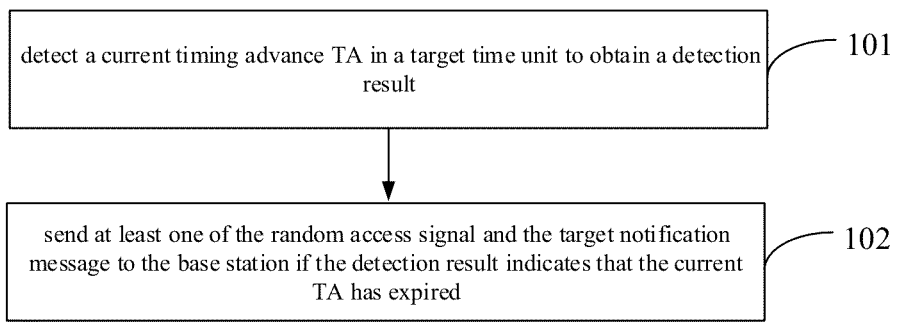
Fig. 2

DATA TRANSMISSION METHOD AND APPARATUS BASED ON TIMING ADVANCE

CROSS REFERENCE TO RELATED APPLICATION

The present application is a national phase application of PCT International Application No. PCT/CN2018/113710 filed on Nov. 2, 2018, the entire disclosure of which is incorporated herein by reference for all purposes.

TECHNICAL FIELD

The present disclosure relates to the technical field of communication, and more particularly, to a data transmission method and apparatus.

BACKGROUND

A data transmission procedure according to a conventional Long Term Evolution (LTE) technology may be as shown in FIG. 1A, where a user equipment needs to complete a random access process first and then send uplink data to a base station after obtaining authorization from the base station. However, in a scenario of an Internet of Things using a New Radio (NR) system, a random access process may bring a huge signaling overhead. Therefore, a grant-free procedure may be adopted, where the user equipment automatically transmits uplink data on a reserved resource according to a preset manner without receiving uplink authorization and performing the random access, as shown in FIG. 1B. Thereby, signaling overhead is reduced and power waste is avoided.

Considering that most services of the Internet of Things at the user equipment are reporting periodically. For example, an electricity meter, a water meter, and the like reports service data at intervals. Thus, the reserved resources configured in the grant-free uplink scheduling also appear periodically.

In uplink transmission of a conventional LTE system, in order to keep data from different user equipments simultaneously arriving at a base station, thereby keeping orthogonality between data and reducing interference, the user equipment sends the data in advance according to a Timing Advance (TA) configured by the base station. Generally, the initial TA is determined by the base station according to a random access preamble sent by the user equipment in a random access process, and the initial TA is sent to the user equipment in a Random Access Response (RAR) message. When a user accesses a network, the originally configured TA may not meet the condition due to a change in a wireless environment or a position change of a user, and at this time the TA needs to be updated again through the random access process.

In the unauthorized scheduling process, the user equipment may use the currently stored TA first, and verify whether the currently stored TA is still valid. If the current TA has expired, the user equipment needs to initiate the random access process so as to obtain a new TA again.

In the related art, if the current TA of the user equipment has expired, the base station still reserves the reserved resource for the user equipment, which causes resource waste.

SUMMARY

According to a first aspect of the present disclosure, there is provided a method for data transmission. The method is configured for a user equipment and includes detecting a current timing advance TA in a target time unit to obtain a detection result. The target time unit is a time unit preceding a first time unit corresponding to a first target resource. The first target resource is a random access resource unit associated with a second target resource and meeting a specified condition. The second target resource is a resource unit in a resource set which is pre-allocated to the user equipment by the base station for reporting grant-free data. The user equipment may further send, if the detection result indicates that the current TA has expired, at least one of a random access signal and a target notification message to the base station. The random access signal is configured to indicate that the base station needs to reconfigure a new TA for the user equipment and to indicate that the base station does not reserve a third target resource for the user equipment any longer, or to indicate that the base station needs to reconfigure a new TA for the user equipment. The target notification message is configured to indicate that the base station does not reserve a third target resource for the user equipment any longer. The third target resource may include at least the second target resource.

According to a second aspect of embodiments of the present disclosure, there is provided a method for data transmission. The method configured for a base station and includes detecting whether at least one of a random access signal and a target notification message sent by a user equipment is received. The random access signal may be configured to indicate that the base station needs to reconfigure a new TA for the user equipment and to indicate that the base station does not reserve a third target resource for the user equipment any longer or to indicate that the base station needs to reconfigure a new TA for the user equipment. The target notification message is configured to indicate that the base station does not reserve a third target resource for the user equipment any longer, with the third target resource including at least a second target resource. The second target resource being a resource unit in a resource set which is pre-allocated to the user equipment by the base station for reporting grant-free data. The base station may further include reconfiguring and returning a new timing advance TA to the user equipment according to the random access signal, if at least one of the random access signal and the target notification message is detected. The method may further include no longer reserving a third target resource for the user equipment according to at least one of the random access signal and the target notification message.

According to a third aspect of embodiments of the present disclosure, there is provided an apparatus configured for a user equipment. The apparatus may include one or more processors, a non-transitory computer-readable memory storing instructions executable by the one or more processors. The one or more processors may be configured to detect a current timing advance TA in a target time unit to obtain a detection result. The target time unit is a time unit preceding a first time unit corresponding to a first target resource. The first target resource is a random access resource unit associated with a second target resource and meeting a specified condition. The second target resource is a resource unit in a resource set which is pre-allocated to the user equipment by the base station for reporting grant-free data. The one or more processors may further be configured to send at least one of a random access signal and a target notification message to the base station, if the detection result indicates that the current TA has expired. The random access signal is configured to indicate that the base station needs to reconfigure a new TA for the user equipment and to indicate that the base station does not reserve a third target resource for the user equipment any longer or to indicate that the base station needs to reconfigure a new TA for the user equipment. The target notification message is configured to indicate that the base station does not reserve a third target resource for the user equipment any longer. The third target resource may include at least the second target resource.

It is to be understood that the above general description and detailed descriptions below are only exemplary and explanatory, and not intended to limit the present disclosure.

BRIEF DESCRIPTION OF THE DRAWINGS

The accompanying drawings here, which are incorporated in and constitute a part of the specification, illustrate embodiments consistent with the present disclosure and, together with the description, serve to explain the principle of the present disclosure.

FIG. 1A is a schematic diagram of a data transmission procedure in the related art.

FIG. 1B is a schematic diagram of a data transmission procedure in an grant-free manner in the related art.

FIG. 2 is a schematic diagram illustrating a data transmission method procedure according to an exemplary embodiment.

DETAILED DESCRIPTION

Figure 3A:
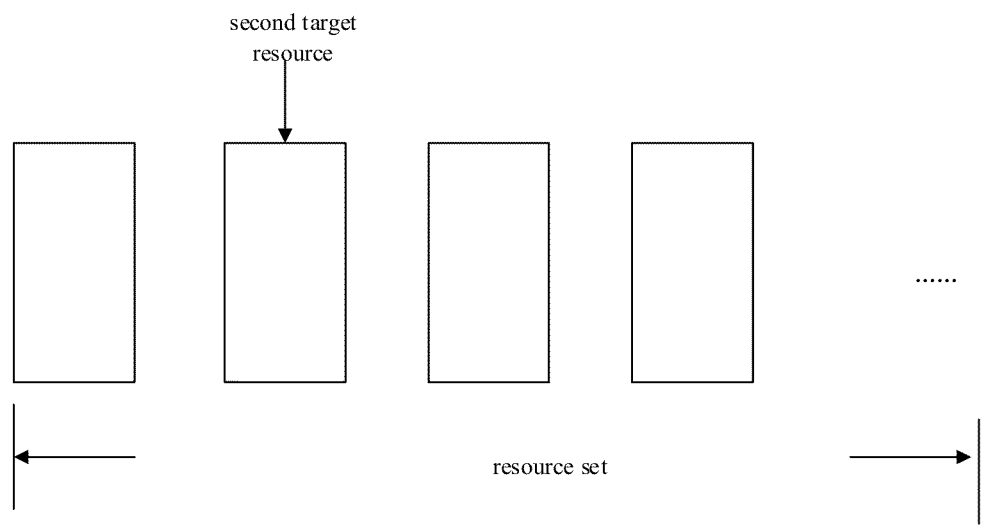
FIGS. 3A-3C are schematic diagrams illustrating a data transmission scenario according to an exemplary embodiment.

Reference will here be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with some aspects of the present disclosure as recited in the appended claims.

Terms used in the present disclosure are only adopted for the purpose of describing specific embodiments and not intended to limit the present disclosure. "A" and "an" used in a singular form in the present disclosure and the appended claims are also intended to include a plural form, unless indicated otherwise. It is also to be understood that term "and/or" used in the present disclosure refers to including one or any or all possible combinations of multiple associated items that are listed.

It is to be understood that, although terms first, second, third and the like may be adopted to describe various information in the present disclosure, the information should not be limited to these terms. These terms are only adopted to distinguish information of the same type. For example, without departing from the scope of the present disclosure, the first information may also be referred to as the second information and, similarly, the second information may also be referred to as the first information. The term "if" used here may be explained as "while" or "when" or "responsive to determining", which depends on the context.

Below, the data transmission method provided by embodiments of the present disclosure is first introduced from the user equipment.

There is provided a data transmission method in an embodiment of the present disclosure, where the method is used for a user equipment. Referring to FIG. 2, FIG. 2 is a flowchart illustrating a data transmission method according to an exemplary embodiment, which may include the following steps.

In step 101, a current timing advance TA is detected in a target time unit to obtain a detection result, where the target time unit is a time unit preceding a first time unit corresponding to a first target resource, the first target resource is a random access resource unit associated with a second target resource and meeting a specified condition, and the second target resource is a resource unit in a resource set which is pre-allocated to the user equipment by the base station for reporting grant-free data.

In step 102, at least one of the random access signal and the target notification message is sent to the base station if the detection result indicates that the current TA has expired, where the random access signal is configured to indicate that the base station needs to reconfigure a new TA for the user equipment and to indicate that the base station does not reserve a third target resource for the user equipment any longer; or where the random access signal is configured to indicate that the base station needs to reconfigure a new TA for the user equipment, and the target notification message is configured to indicate that the base station does not reserve a third target resource for the user equipment any longer, wherein the third target resource includes at least the second target resource.

In the above embodiment, the user equipment can detect in advance whether the current TA has expired, and when the current TA has expired, the base station configures a new TA for the user equipment, and the base station will not reserve the third target resource for the user equipment any longer. Thus, the resources in the Internet of Things are saved.

A second target resource is first introduced for the above step 101, where the second target resource is a resource unit in a resource set which is pre-allocated to the user equipment by the base station for reporting grant-free data, for example, as shown in FIG. 3A.

Further, the first target resource is a random access resource associated with the second target resource, meeting a specified condition and used for random access. In this case, the user equipment can directly acquire the specified condition predefined in the protocol, or the base station can configure the specified condition for the user equipment, and the user equipment will simply receive the preset condition sent by the base station through a preset signaling, for example, an RRC signaling In an embodiment of the present disclosure, the preset condition can include: the time unit where the first target resource is located is preceding the time unit where the second target resource is located, and a target difference is minimal. In this case, the target difference is a difference value between a time unit number of the time unit where the first target resource is located and a time unit number of the time unit where the second target resource is located.

Figure 3B:
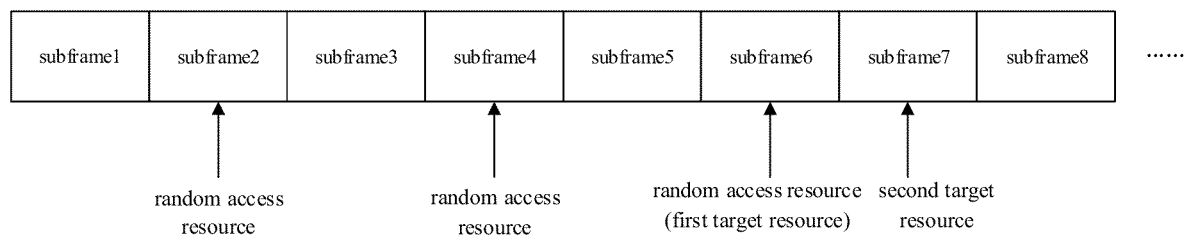

For example, the time unit where the second target resource is located is the seventh subframe, and the random access resources are provided on the second subframe, the fourth subframe and the sixth subframe. In this case, the user equipment can use the resource unit corresponding to the sixth subframe as the first target resource, as shown in FIG. 3B.

Alternatively, the specified condition can include: the time unit where the first target resource is located is preceding the time unit where the second target resource is located, and the target difference is not only minimal but also greater than or equal to a preset value.

Figure 3C:
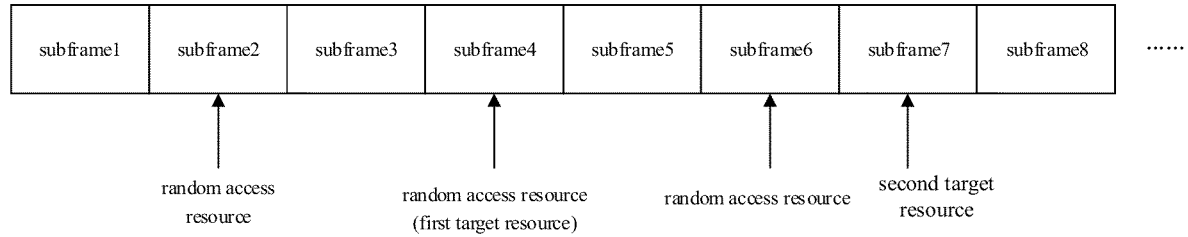

For example, the time unit where the second target resource is located is the seventh subframe, the random access resources are provided on the second subframe, the fourth subframe and the sixth subframe, and the preset value is 2. In this case, the user equipment can use the resource unit corresponding to the fourth subframe as the first target resource, as shown in FIG. 3C.

In an embodiment of the present disclosure, the user equipment needs to measure the current TA in the target time unit. That is, the user equipment needs to detect the current TA in any time unit preceding the time unit where the first target resource is located, and determine whether the current TA is valid.

Optionally, the user equipment can measure a current Reference Signal Receiving Power (RSRP) value, and if a difference value between the current RSRP value and the RSRP value measured during the last successful data transmission is smaller than a preset threshold, it can be determined that the current TA is still valid, and otherwise it is determined that the current TA has expired.

For the above step 102, if the user equipment determines that the current TA has expired, then in a first case, the user equipment may only send the random access signal to the base station, so that the base station can reconfigure a new TA for the user equipment according to the random access signal, and that the base station will not reserve the third target resource for the user equipment any longer.

If the user equipment determines that the current TA has expired, then in a second case, the user equipment can send the random access signal and the target notification message to the base station, so that the base station can reconfigure a new TA for the user equipment according to the random access signal, and cannot reserve the third target resource for the user equipment any longer according to the target notification message.

The above two cases are introduced below.

In the first case, the random access signal can simultaneously indicate that the base station needs to reconfigure a new TA for the user equipment and no longer reserve the third target resource for the user equipment. Optionally, at this time, the random access signal can be a first specified random access preamble which is pre-allocated to the user equipment by the base station.

Accordingly, step 102 may be specifically:

sending a first random access signaling to the base station by the first target resource, where the first random access signaling includes the first specified random access preamble.

In this step, the base station can detect whether the first specified random preamble sent by the user equipment through the first random access signaling, for example, msg.1 signaling, is received or not on the first target resource. If the first specified random preamble sent by the user equipment through the first random access signaling is detected on the first target resource, the base station will reconfigure a new TA for the user equipment, and the base station will not reserve the third target resource for the user equipment any longer.

In the second case, the random access signal is only used to indicate that the base station needs to reconfigure a new TA for the user equipment, and the target notification message is used to indicate that the base station does not reserve the third target resource for the user equipment any longer. Optionally, at this time, the random access signal can be a second specified random access preamble which is pre-allocated to the user equipment by the base station, and the target notification message can be preset identification information. In this case, the preset identification information can be a Cell Radio Network identification information which is pre-allocated to the user equipment by the base station, for example, Cell Radio Network Temporary Identity (C-RNTI).

Accordingly, step 102 may be specifically:

sending the first random access signaling to the base station by the first target resource, where the first random access signaling includes the first specified random access preamble; and sending the second random access signaling to the base station by a fourth target resource, where the second random access signaling includes the preset identification information, and the fourth target resource is a resource which is allocated by the base station to the user equipment for carrying the second random access signaling in the process of random access to the user equipment.

At this time, the base station can detect whether a first specified random preamble sent by the user equipment through the first random access signaling, for example, msg.1 signaling, is received or not on the first target resource. If the second specified random preamble sent by the user equipment through the first random access signaling is detected on the first target resource, the base station will reconfigure a new TA for the user equipment. In addition, the base station can detect whether the preset identification information sent by the user equipment through the second random access signaling, for example, msg.3 signaling, is received or not on the fourth target resource. If the base station detects the preset identification information sent by the user equipment through the second random access signaling on the fourth target resource, the base station will not reserve the third target resource for the user equipment any longer.

In an embodiment of the present disclosure, the third target resource includes at least the second target resource.

In the above embodiment, the user equipment detects the current TA in the target time unit, so that detection of the current TA in advance is achieved. In addition, the user equipment can send at least one of the random access signal and the target notification message to the base station, so that the base station will reconfigure a new TA for the user equipment, and notify the base station to not reserve the third target resource for the user equipment any longer, thus saving physical network resources.

In an embodiment, the user equipment currently has target data that needs be sent to the base station. But, since the base station does not reserve the third target resource for the user equipment any longer, the user equipment needs to send the target data in other ways.

Optionally, the user equipment can carry the target data in the second random access signaling, for example, msg.3, and send the random access data required to be carried originally in msg.3 together with the target data to the base station through the second random access signaling.

In the above embodiment, the user equipment can carry the target data in the second random access signaling when sending the second random access signaling to the base station. Thus, the target data that needs to be reported currently to the base station can be sent to the base station in the process of random access to the base station.

Figure 4:
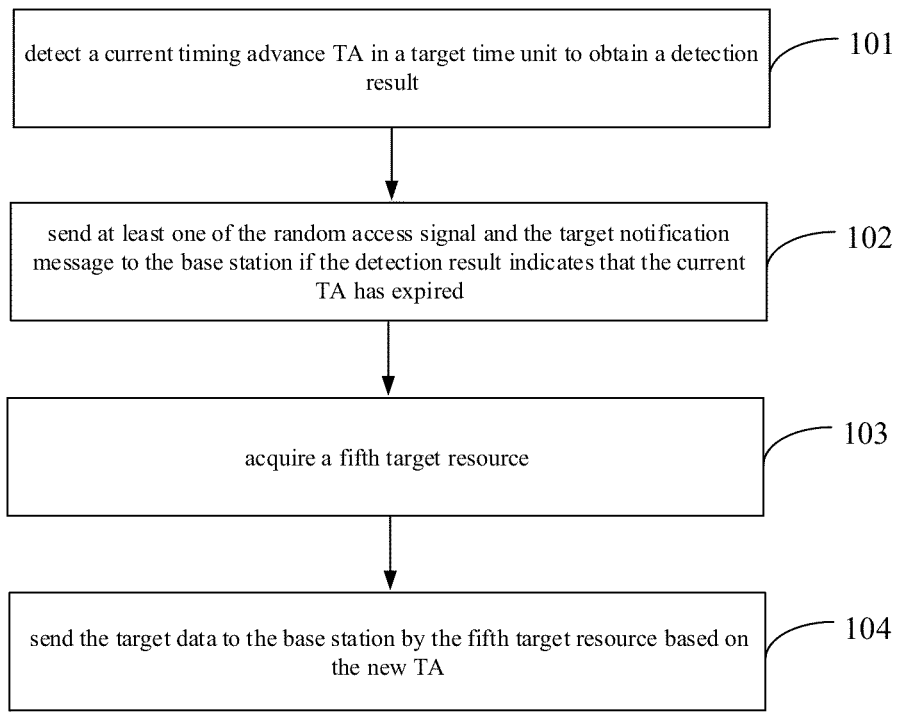
FIG. 4 is a flowchart illustrating another data transmission method according to an exemplary embodiment.

In an embodiment, the user equipment currently has target data that needs be sent to the base station. Then, referring to FIG. 4, FIG. 4 is a flowchart of another data transmission method according to an embodiment as shown in FIG. 2, where the above method may also include the following steps.

In step 103, a fifth target resource is acquired, where the fifth target resource is a resource which is re-allocated by the base station to the user equipment for data reporting after a random access process is complete between the user equipment and the base station.

In an embodiment of the present disclosure, the base station can re-allocate the fifth target resource for data reporting to the user equipment after completing the random access process to the user equipment. Accordingly, in this step, the user equipment can acquire the fifth target resource after completing the random access process.

In step 104, the target data is sent to the base station by the fifth target resource based on the new TA, where the target data is the data that needs to be currently reported to the base station by the user equipment.

In this step, the user equipment can directly send the target data to the base station by the fifth target resource, based on the new TA that is reconfigured for the user equipment previously.

In the above embodiment, after completing the random access process to the base station, the user equipment can also send the target data to the base station by the fifth target resource, which is re-allocated for the user equipment by the base station, based on the new TA reconfigured by the base station. The purpose of sending the target data to the base station based on the new TA is achieved.

In an embodiment, the base station does not reserve the third target resource for the user equipment any longer. Optionally, the base station can determine the number of resource units included in the third target resource. For example, when the base station determines that the TA step loss frequently occurs in the user equipment, the base station determines that it does not make much sense to continue to reserve resources for the user equipment, and at this time, all resource units in the resource set may not be reserved for the user equipment any longer. That is, the third target resource may include all resource units in the resource set.

If a user only occasionally loses step, the base station can still reserve part of the resource units in the resource set. That is, the third target resource may only include the second target resource, or the third target resource may include the second target resource and also at least one resource unit located after the second target resource in the resource set.

If the third target resource includes the second target resource and at least one resource unit located after the second target resource in the resource set, the user equipment can directly acquire the number of resource units located after the second target resource, which is predefined in a protocol. Alternatively, the user equipment can also receive the number of resource units located after the second target resource, which is sent by the base station through a preset signaling.

After determining the number of resource units after the second target resource, the user equipment will no longer use the third target resource to send subsequent data. The base station can allocate the third target resource to other user equipments, thereby saving the resources in the physical network.

Below, the data transmission method provided by embodiments of the present disclosure is introduced from the base station side.

Figure 5:
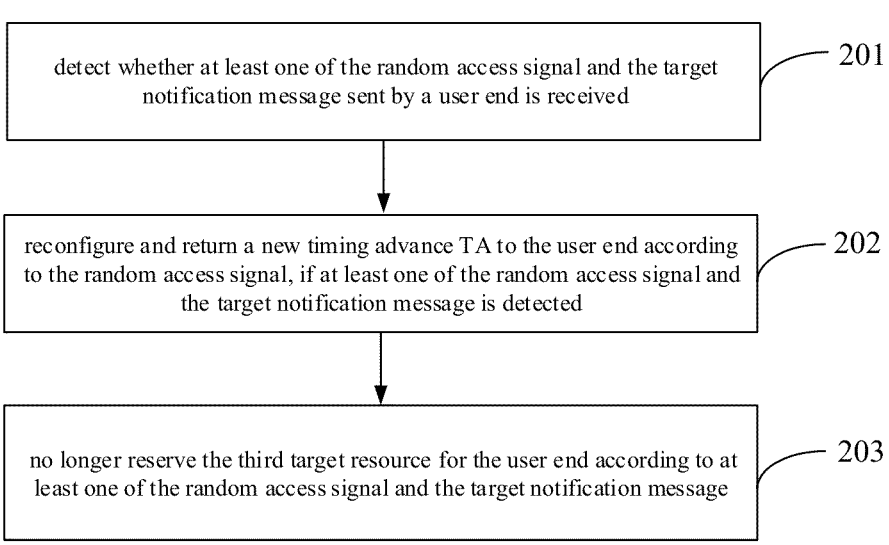
FIG. 5 is a flowchart illustrating another data transmission method according to an exemplary embodiment.

There is provided another data transmission method in an embodiment of the present disclosure, where the method is used for a base station. Referring to FIG. 5, FIG. 5 is a flowchart illustrating another data transmission method according to an exemplary embodiment, which may include the following steps.

In step 201, it is detected whether at least one of the random access signal and the target notification message sent by the user equipment is received, where the random access signal is used to indicate that the base station needs to reconfigure a new TA for the user equipment and to indicate that the base station does not reserve the third target resource for the user equipment any longer; or where the random access signal is used to indicate that the base station needs to reconfigure a new TA for the user equipment, and the target notification message is used to indicate that the base station does not reserve a third target resource for the user equipment any longer, wherein the third target resource includes at least a second target resource, and the second target resource is any resource unit in a resource set which is pre-allocated to the user equipment by the base station for reporting grant-free data.

In step 202, a new timing advance TA is reconfigured and returned to the user equipment according to the random access signal, if at least one of the random access signal and the target notification message is detected.

In step 203, the third target resource is no longer reserved for the user equipment according to at least one of the random access signal and the target notification message.

In the above embodiment, when the current TA of the user equipment has expired, the base station can configure a new TA for the user equipment, and the base station does not reserve a third target resource for the user equipment any longer, so that the resources in the Internet of Things are saved.

For the above step 201, in a first case, the base station can receive only the random access signal, where the random access signal is used to indicate that the base station needs to reconfigure a new TA for the user equipment and also indicate that the base station does not reserve the third target resource for the user equipment any longer.

At this time, the random access signal is the first specified random access preamble which is pre-allocated to the user equipment by the base station.

Correspondingly, step 201 may be specifically: detecting whether the first specified random access preamble sent by the user equipment through the first random access signaling is received or not on the first target resource, where the first target resource is a random access resource unit associated with the second target resource and meeting a specified condition.

The way for determining the first target resource on the base station side is the same as the way for determining the first target resource on the end side in step 101, which will not be described herein again.

In this step, the base station detects whether the first specified random access preamble sent by the user equipment through the first random access signaling, for example, msg.1, is received or not only on the first target resource.

In a second case, the base station can receive a random access signal and a target notification message sent by the user equipment, where the random access signal is used to indicate that the base station needs to reconfigure a new TA for the user equipment, and the target notification message is used to indicate that the base station does not reserve the third target resource for the user equipment any longer.

In this case, the random access signal is the second specified random access preamble which is pre-allocated to the user equipment by the base station, and the second specified random access preamble is only used to indicate that the base station needs to reconfigure a new TA for the user equipment. The target notification message can be preset identification information, for example, C-RNTI which is pre-allocated to the user equipment by the base station, where the target notification message is used to indicate that the base station does not reserve the third target resource for the user equipment any longer.

Correspondingly, step 201 may be specifically: detecting whether the first specified random access preamble sent by the user equipment through the first random access signaling is received or not on the first target resource; and detecting whether the preset identification information sent by the user equipment through the second random access signaling is received or not on the fourth target resource.

In this case, the base station needs to detect whether the second specified random access preamble sent by the user equipment through the first random access signaling, for example, msg.1 signaling, is received or not on the first target resource, and meanwhile, the base station needs to detect whether the preset identification information sent by the user equipment through the second random access signaling, for example, msg.3 signaling, is received or not on the fourth target resource.

In an embodiment of the present disclosure, the fourth target resource is a resource allocated by the base station to the user equipment for carrying the second random access signaling in the process of random access to the user equipment.

For the above step 202, if the base station detects that the first specified random access preamble or the second specified random access preamble sent by the user equipment through the first random access signaling is received on the first target resource, the base station will reconfigure a new TA for the user equipment.

For the above step 203, if the base station detects on the first target resource that the first specified random access preamble sent by the user equipment through the first random access signaling is received, in this step, the base station will also no longer reserve the third target resource for the user equipment according to the first specified random access preamble. Optionally, the third target resource includes at least the second target resource.

If the base station detects on the fourth target resource that the preset identification information sent by the user equipment through the second random access signaling is received, the base station will also no longer reserve the third target resource for the user equipment according to the preset identification information. Optionally, the third target resource includes at least the second target resource.

In an embodiment of the present disclosure, the base station can allocate the third target resource to other user equipments for use. Thus, the third target resource is no longer reserved for the user equipment when the current TA of the user equipment has expired, thereby achieving the purpose of saving the resources in the physical network.

In an embodiment, the second random access signaling received by the base station also includes the target data that the user equipment needs to report to the base station currently.

Figure 6:
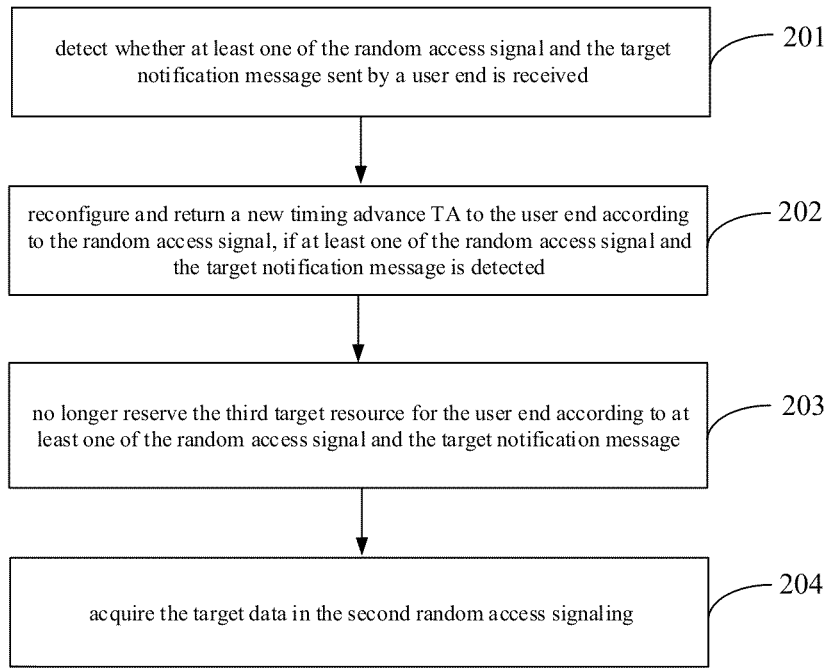
FIG. 6 is a flowchart illustrating another data transmission method according to an exemplary embodiment.

Accordingly, referring to FIG. 6, FIG. 6 is a flowchart illustrating another data transmission method according to an embodiment shown in FIG. 5, where the above method can also include the following steps.

In step 204, the target data is acquired in the second random access signaling.

In this step, the base station can read the target data from the second random access signaling.

In the above embodiment, the target data sent by the user equipment through the second random access signaling can be acquired in the process of random access to the base station.

Figure 7:
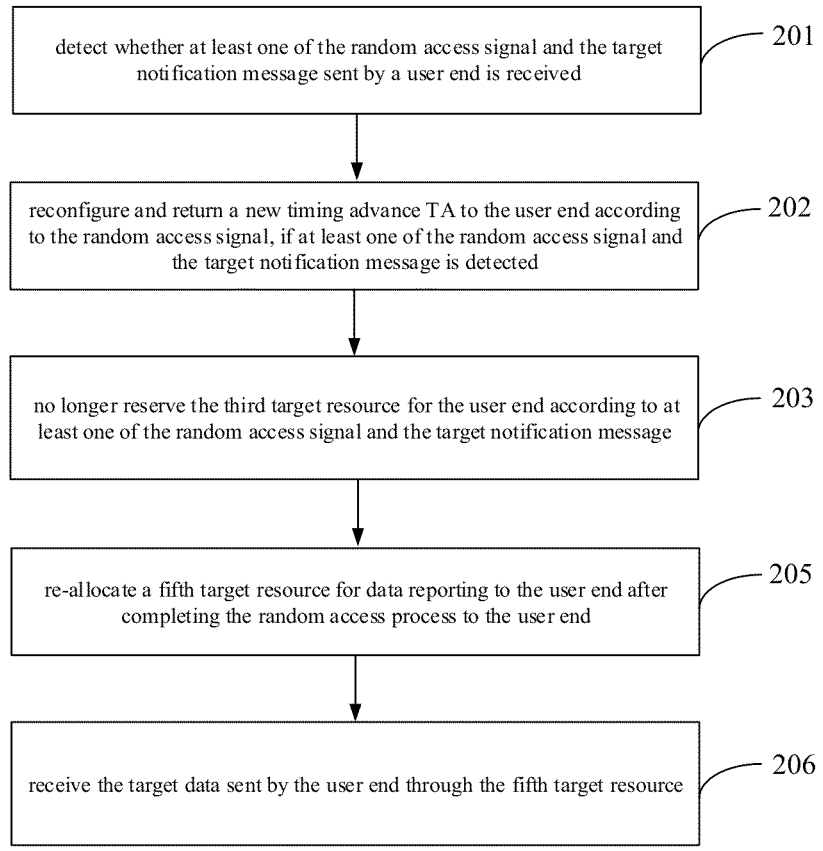
FIG. 7 is a flowchart illustrating another data transmission method according to an exemplary embodiment.

In an embodiment, referring to FIG. 7, FIG. 7 is a flowchart illustrating another data transmission method according to an embodiment shown in FIG. 5, where the above method can also include the following steps.

In step 205, the fifth target resource is re-allocated to the user equipment for data reporting after the random access process to the user equipment is complete.

In this step, after the random access process to the user equipment is complete, the base station can reconfigure the fifth target resource for the user equipment, so that the user equipment can report the target data by the fifth target resource.

In step 206, the target data sent by the user equipment through the fifth target resource is received, where the target data is the data that the user equipment needs to report to the base station currently.

In this step, if the base station configures the fifth target resource for the user equipment, the base station can read the target data reported by the user equipment through the fifth target resource.

In the above embodiment, the purpose of acquiring the target data reported by the user equipment through the reallocated fifth target resource is achieved at the base station side.

In an embodiment, the base station can determine the number of resource units included in the third target resource that is no longer reserved for the user equipment. For example, when it is determined that the TA step loss frequently occurs in the user equipment, the base station determines that it does not make much sense to continue to reserve resources for the user equipment. At this time, all resource units in the resource set will not be reserved for the user equipment any longer. That is, the third target resource can include all resource units in the resource set.

If a user only occasionally loses step, the base station can still reserve part of the resource units in the resource set. That is, the third target resource may only include the second target resource, or the third target resource can include the second target resource and also at least one resource unit located after the second target resource in the resource set.

If the base station determines that the third target resource includes the second target resource and at least one resource unit located after the second target resource in the resource set, the base station can directly acquire the number of resource units located after the second target resource, which is predefined in a protocol. Alternatively, the base station can also determine the number of resource units located after the second target resource through an RRC layer, and send the number of resource units located after the second target resource to the user equipment by a preset signaling, for example, an RRC signaling.

After the base station does not reserve the third resource for the user equipment any longer, the third resource can be reserved for other user equipments. Thus, when the current TA of the user equipment has expired, the third target resource will not be reserved for the user equipment any longer, thereby saving the resources in the Internet of Things.

Figure 8:
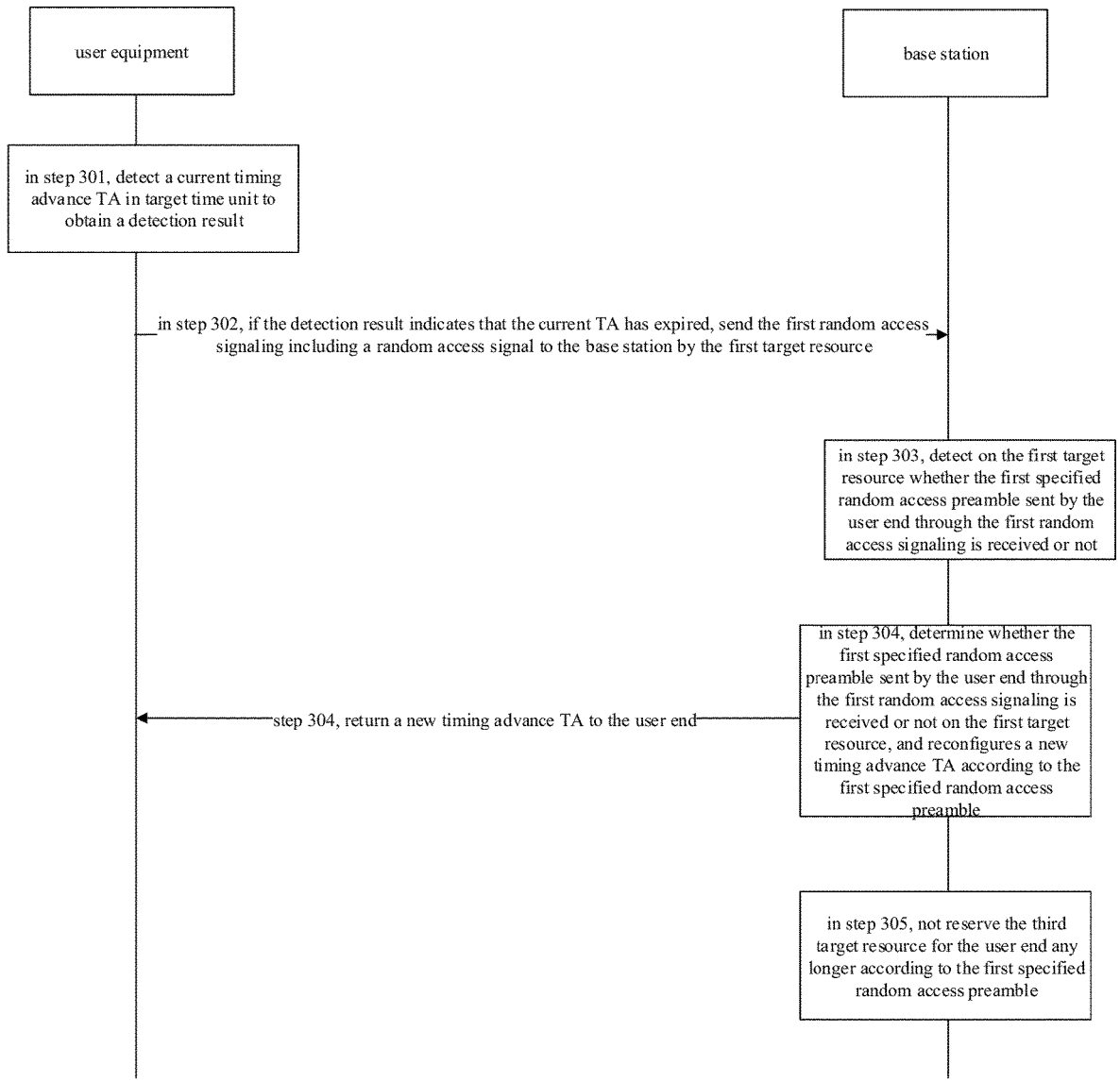
FIG. 8 is a flowchart illustrating another data transmission method according to an exemplary embodiment.

In an embodiment, referring to FIG. 8, FIG. 8 is a flowchart illustrating another data transmission method according to an exemplary embodiment, which may include the following steps.

In step 301, the user equipment detects a current timing advance TA in a target time unit to obtain a detection result, where the target time unit is any time unit preceding a first time unit corresponding to a first target resource, the first target resource is a random access resource unit associated with a second target resource and meeting a specified condition, and the second target resource is any resource unit in a resource set which is pre-allocated to the user equipment by the base station for reporting grant-free data.

In step 302, if the detection result indicates that the current TA has expired, the user equipment sends the first random access signaling including a random access signal to the base station by the first target resource.

The random access signal is used to indicate that the base station needs to reconfigure a new TA for the user equipment and to indicate that the base station does not reserve the third target resource for the user equipment any longer. Optionally, the random access signal is the first specified random access preamble which is pre-allocated to the user equipment by the base station, and the first random access signaling is msg.1 signaling.

In step 303, the base station detects on the first target resource whether the first specified random access preamble sent by the user equipment through the first random access signaling is received or not.

In step 304, the base station determines whether the first specified random access preamble sent by the user equipment through the first random access signaling is received or not on the first target resource, and reconfigures and returns a new timing advance TA to the user equipment according to the first specified random access preamble.

In step 305, the base station does not reserve the third target resource for the user equipment according to the first specified random access preamble.

In the above embodiment, the user equipment can detect the current TA in the target time unit. Compared with the prior art, the user equipment achieves the purpose of detecting the current TA in advance. In addition, the user equipment can indicate by the random access signal that the base station needs to reconfigure a new TA for the user equipment and meanwhile indicate that the base station does not reserve the third target resource for the user equipment any longer, thereby saving the resources in the Internet of Things.

Figure 9:
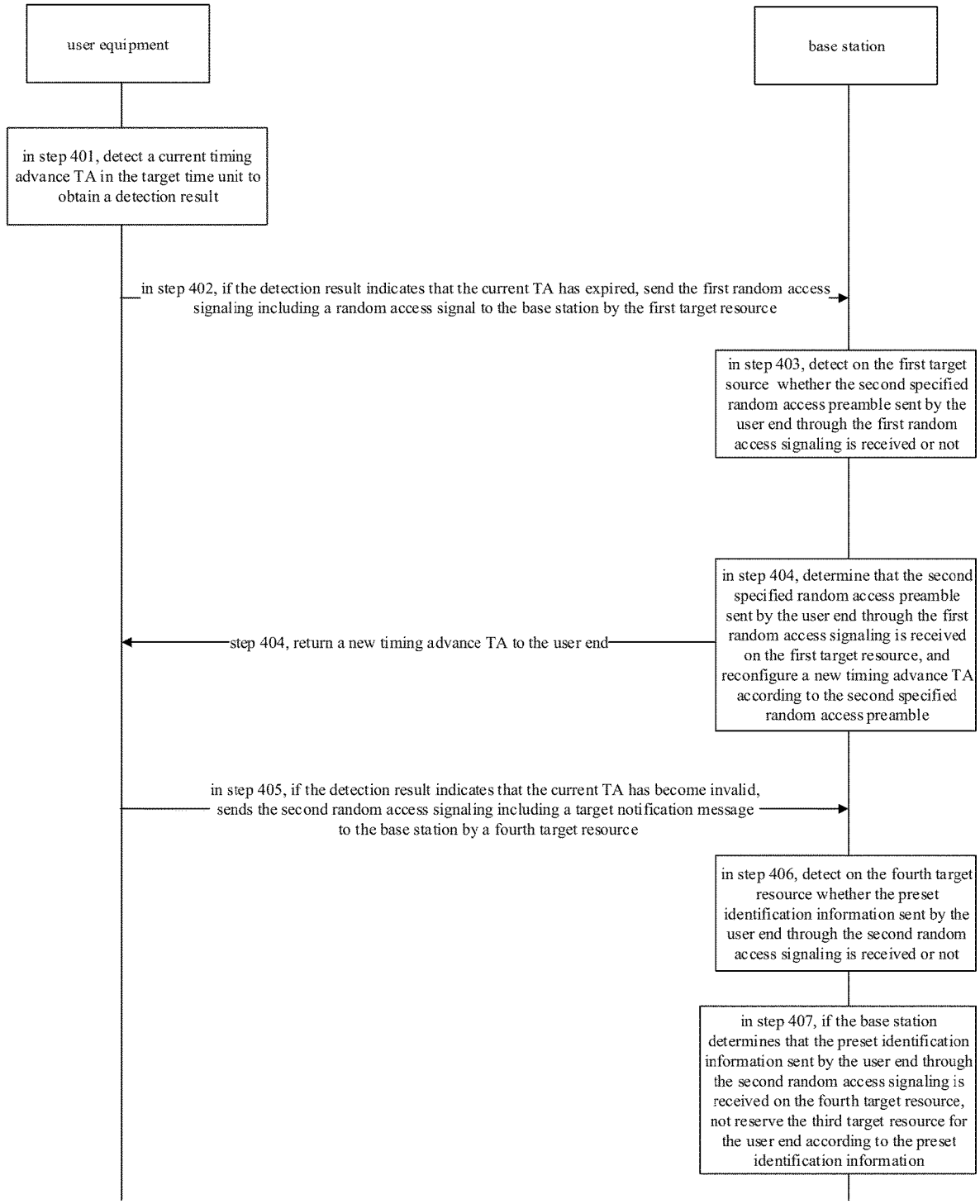
FIG. 9 is a flowchart illustrating another data transmission method according to an exemplary embodiment.

In an embodiment, referring to FIG. 9, FIG. 9 is a flowchart illustrating another data transmission method according to an exemplary embodiment, which may include the following steps.

In step 401, the user equipment detects a current timing advance TA in a target time unit to obtain a detection result, where the target time unit is any time unit preceding a first time unit corresponding to the first target resource, the first target resource is a random access resource unit associated with the second target resource and meeting a specified condition, and the second target resource is any resource unit in a resource set which is pre-allocated to the user equipment by the base station for reporting grant-free data.

In step 402, if the detection result indicates that the current TA has expired, the user equipment sends the first random access signaling including a random access signal to the base station by the first target resource.

The random access signal is used to indicate that the base station needs to reconfigure a new TA for the user equipment. Optionally, the random access signal is the second specified random access preamble which is pre-allocated to the user equipment by the base station, and the first random access signaling is msg.1 signaling.

In step 403, the base station detects on the first target resource whether the second specified random access preamble sent by the user equipment through the first random access signaling is received or not.

In step 404, the base station determines that the second specified random access preamble sent by the user equipment through the first random access signaling is received on the first target resource, and reconfigures and returns a new timing advance TA to the user equipment according to the second specified random access preamble.

In step 405, if the detection result indicates that the current TA has expired, the user equipment sends the second random access signaling including a target notification message to the base station by a fourth target resource.

The fourth target resource is a resource which is allocated by the base station to the user equipment for carrying the second random access signaling in the process of random access to the user equipment, the target notification message can use the preset identification information, for example, C-RNTI, and the second random access signaling can be msg.3.

In step 406, the base station detects on the fourth target resource whether the preset identification information sent by the user equipment through the second random access signaling is received or not.

In step 407, if the base station determines on the fourth target resource that the preset identification information sent by the user equipment through the second random access signaling is received, the base station does not reserve the third target resource for the user equipment according to the preset identification information.

In the above embodiment, the user equipment can detect the current TA in the target time unit. Compared with the prior art, the user equipment achieves the purpose of detecting the current TA in advance. In addition, the user equipment can indicate by the random access signal that the base station needs to reconfigure a new TA for the user equipment, and indicate by the target notification message that the base station does not reserve the third target resource for the user equipment any longer, thereby achieving the purpose of saving the resources in the Internet of Things.

Corresponding to embodiments of the abovementioned application function implementation method, the present disclosure also provides embodiments of an application function implementation apparatus, a corresponding user equipment, and a corresponding base station.

Figure 10:
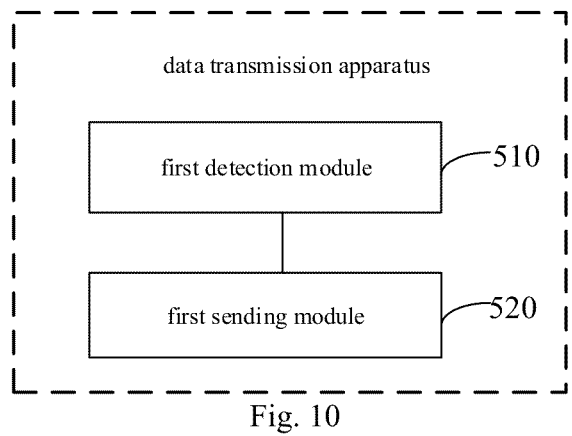
FIG. 10 is a block diagram illustrating a data transmission apparatus according to an exemplary embodiment.

Referring to FIG. 10, FIG. 10 is a block diagram illustrating a data transmission apparatus according to an exemplary embodiment, where the apparatus is used for a user equipment, and the apparatus includes:

a first detection module 510, which is configured to detect a current timing advance TA in a target time unit to obtain a detection result, where the target time unit is any time unit preceding a first time unit corresponding to a first target resource, the first target resource is a random access resource unit associated with the second target resource and meeting a specified condition, and the second target resource is any resource unit in a resource set which is pre-allocated to the user equipment by the base station for reporting grant-free data; and a first sending module 520, which is configured to send at least one of a random access signal and a target notification message to the base station, if the detection result indicates that the current TA has expired, where the random access signal is used to indicate that the base station needs to reconfigure a new TA for the user equipment and to indicate that the base station does not reserve a third target resource for the user equipment any longer; or where the random access signal is used to indicate that the base station needs to reconfigure a new TA for the user equipment, and the target notification message is used to indicate that the base station does not reserve the third target resource for the user equipment any longer, wherein the third target resource includes at least the second target resource.

Optionally, the specified conditions include:
the time unit where the first target resource is located is preceding the time unit where the second target resource is located; and
the specified conditions also include:
a target difference is minimal; or
a target difference value is minimal and also greater than or equal to a preset value;
where the target difference is a difference value between a time unit number of the time unit where the first target resource is located and a time unit number of the time unit where the second target resource is located.

Optionally, if the random access signal is used to indicate that the base station needs to reconfigure a new TA for the user equipment and indicate that the base station does not reserve the third target resource for the user equipment any longer, the random access signal is the first specified random access preamble which is pre-allocated to the user equipment by the base station.

Figure 11:
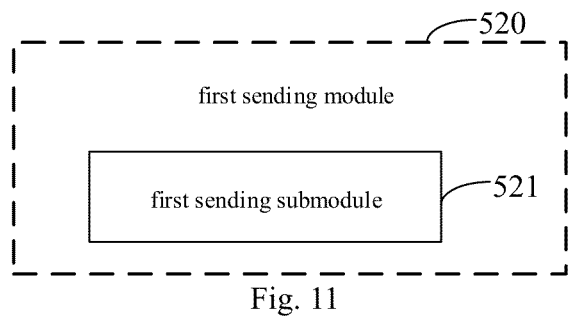
FIG. 11 is a block diagram illustrating another data transmission apparatus according to an exemplary embodiment.

Referring to FIG. 11, FIG. 11 is a block diagram of another data transmission apparatus illustrated on the basis of an embodiment shown in FIG. 10, where the first sending module 520 includes:

a first sending submodule 521, which is configured to send the first random access signaling to the base station by the first target resource, where the first random access signaling includes the first specified random access preamble.

Optionally, if the random access signal is used to indicate that the base station needs to reconfigure a new TA for the user equipment, and the target notification message is used to indicate that the base station does not reserve the third target resource for the user equipment any longer, the random access signal is the second specified random access preamble which is pre-allocated to the user equipment by the base station, and the target notification message is preset identification information, where the preset identification information is Cell Radio Network identification information which is pre-allocated to the user equipment by the base station.

Figure 12:
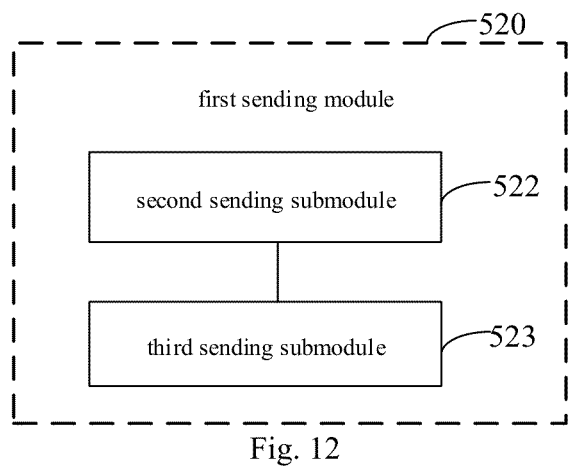
FIG. 12 is a block diagram illustrating another data transmission apparatus according to an exemplary embodiment.

Referring to FIG. 12, FIG. 12 is a block diagram of another data transmission apparatus illustrated on the basis of an embodiment shown in FIG. 10, where the first sending module 520 includes:

a second sending submodule 522, which is configured to send the first random access signaling to the base station by the first target resource, where the first random access signaling includes the second specified random access preamble; and a third sending submodule 523, which is configured to send the second random access signaling to the base station by a fourth target resource, where the second random access signaling includes the preset identification information, and the fourth target resource is a resource which is allocated by the base station to the user equipment for carrying the second random access signaling in the process of random access to the user equipment.

Optionally, the second random access signaling also includes target data, where the target data is the data that the user equipment needs to report to the base station currently.

Figure 13:
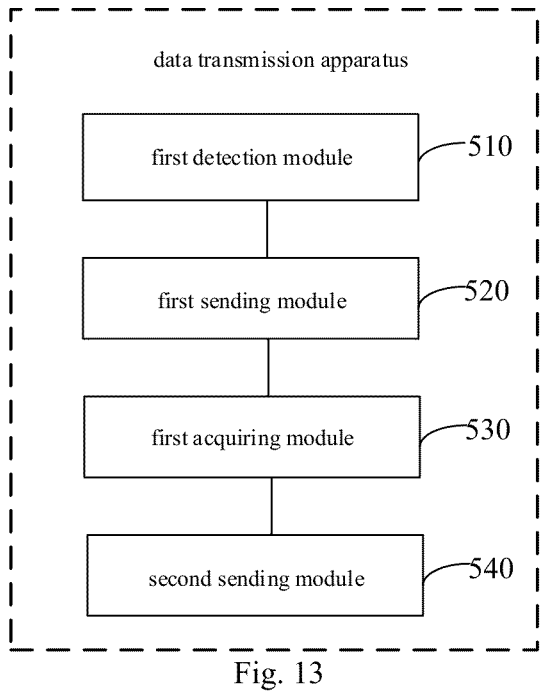
FIG. 13 is a block diagram illustrating another data transmission apparatus according to an exemplary embodiment.

Referring to FIG. 13, FIG. 13 is a block diagram of another data transmission apparatus illustrated on the basis of an embodiment shown in FIG. 10, where the apparatus also includes:

a first acquiring module 530, which is configured to acquire a fifth target resource, where the fifth target resource is a resource which is re-allocated by the base station to the user equipment for data reporting after a random access process is complete between the user equipment and the base station; and a second sending module 540, which is configured to send the target data to the base station by the fifth target resource based on the new TA, where the target data is the data that the user equipment needs to report to the base station currently.

Optionally, the third target resource includes all resource units in the resource set; or the third target resource includes the second target resource; or the third target resource includes the second target resource and at least one resource unit located after the second target resource in the resource set.

Figure 14:
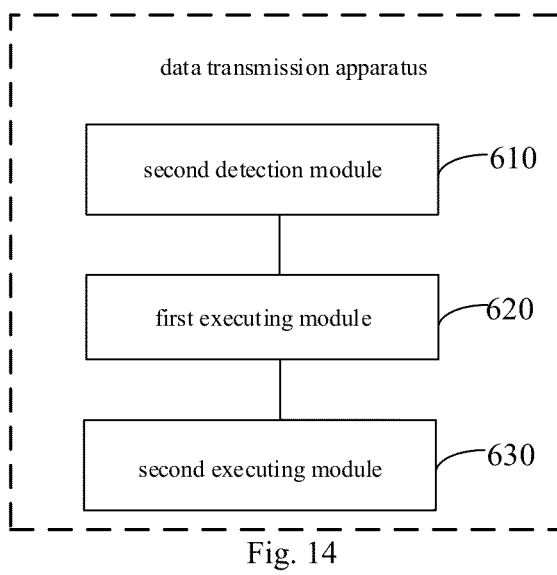
FIG. 14 is a block diagram illustrating another data transmission apparatus according to an exemplary embodiment.

Referring to FIG. 14, FIG. 14 is a block diagram illustrating another data transmission apparatus according to an exemplary embodiment, where the apparatus is used for a user equipment, and the apparatus includes:

a second detection module 610, which is configured to detect whether at least one of the random access signal and the target notification message sent by a user equipment is received;

where the random access signal is used to indicate that the base station needs to reconfigure a new TA for the user equipment and indicate that the base station does not reserve the third target resource for the user equipment any longer; or where the random access signal is used to indicate that the base station needs to reconfigure a new TA for the user equipment, and the target notification message is used to indicate that the base station does not reserve the third target resource for the user equipment any longer, wherein the third target resource includes at least the second target resource, and the second target resource is any resource unit in a resource set which is pre-allocated to the user equipment by the base station for reporting grant-free data;

a first executing module 620, which is configured to reconfigure and return a new timing advance TA to the user equipment according to the random access signal, if at least one of the random access signal and the target notification message is detected; and a second executing module 630, which is configured to no longer reserve the third target resource for the user equipment according to at least one of the random access signal and the target notification message.

Optionally, if the random access signal is used to indicate that the base station needs to reconfigure a new TA for the user equipment and indicate that the base station does not reserve the third target resource for the user equipment any longer, the random access signal is the first specified random access preamble which is pre-allocated to the user equipment by the base station.

Figure 15:
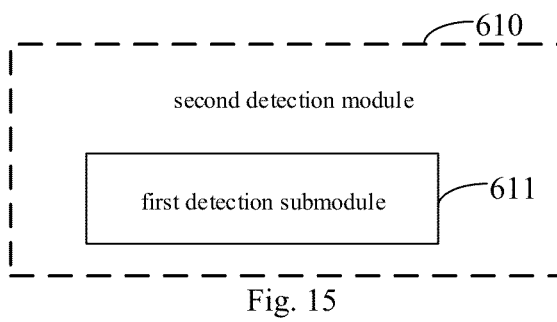
FIG. 15 is a block diagram illustrating another data transmission apparatus according to an exemplary embodiment.

Referring to FIG. 15, FIG. 15 is a block diagram of another data transmission apparatus illustrated on the basis of an embodiment shown in FIG. 14, where the second detection module 610 includes:

a first detection submodule 611, which is configured to detect on the first target resource whether the first specified random access preamble sent by the user equipment through the first random access signaling is received or not, where the first target resource is a random access resource unit associated with the second target resource and meeting a specified condition.

Optionally, if the random access signal is used to indicate that the base station needs to reconfigure a new TA for the user equipment, and the target notification message is used to indicate that the base station does not reserve the third target resource for the user equipment any longer, the random access signal is the second specified random access preamble which is pre-allocated to the user equipment by the base station, and the target notification message is preset identification information, where the preset identification information is Cell Radio Network identification information which is pre-allocated to the user equipment by the base station.

Figure 16:
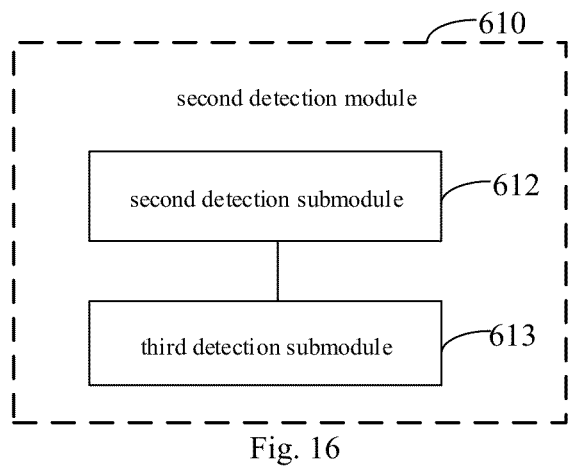
FIG. 16 is a block diagram illustrating another data transmission apparatus according to an exemplary embodiment.

Referring to FIG. 16, FIG. 16 is a block diagram of another data transmission apparatus illustrated on the basis of an embodiment shown in FIG. 14, where the second detection module 610 includes:

a second detection submodule 612, which is configured to detect on the first target resource whether the first specified random access preamble sent by the user equipment through the first random access signaling is received or not, where the first target resource is a random access resource unit associated with the second target resource and meeting a specified condition; and a third detection submodule 613, which is configured to detect on the fourth target resource whether the preset identification information sent by the user equipment through the second random access signaling is received or not, where the fourth target resource is a resource which is allocated by the base station to the user equipment for carrying the second random access signaling in the process of random access to the user equipment.

Optionally, the second random access signaling also includes target data, where the target data is the data that the user equipment needs to report to the base station currently.

Figure 17:
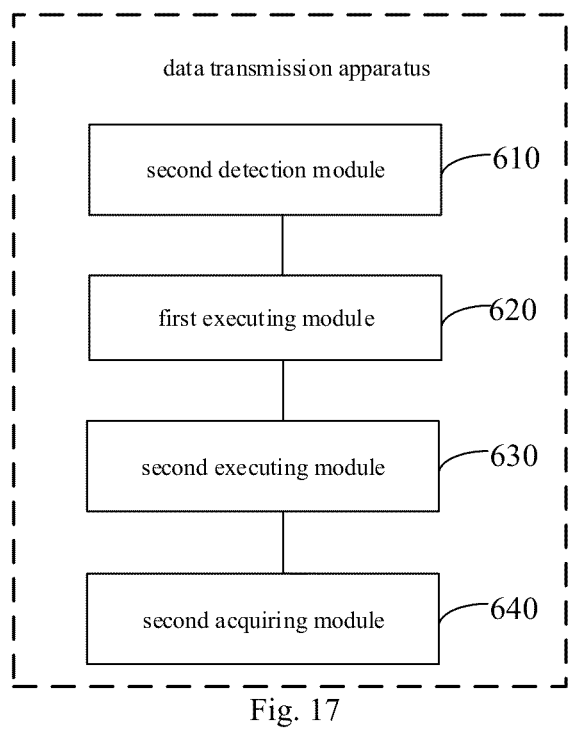
FIG. 17 is a block diagram illustrating another data transmission apparatus according to an exemplary embodiment.

Then, referring to FIG. 17, FIG. 17 is a block diagram of another data transmission apparatus illustrated on the basis of an embodiment shown in FIG. 14, where the apparatus also includes:

a second acquiring module 640, which is configured to acquire the target data in the second random access signaling.

Optionally, the specified condition include:

the time unit where the first target resource is located is preceding the time unit where the second target resource is located; and the specified condition also includes:

a target difference is minimal; or a target difference is minimal and also greater than or equal to a preset value;

where the target difference is a difference value between a time unit number of the time unit where the first target resource is located and a time unit number of the time unit where the second target resource is located.

Figure 18:
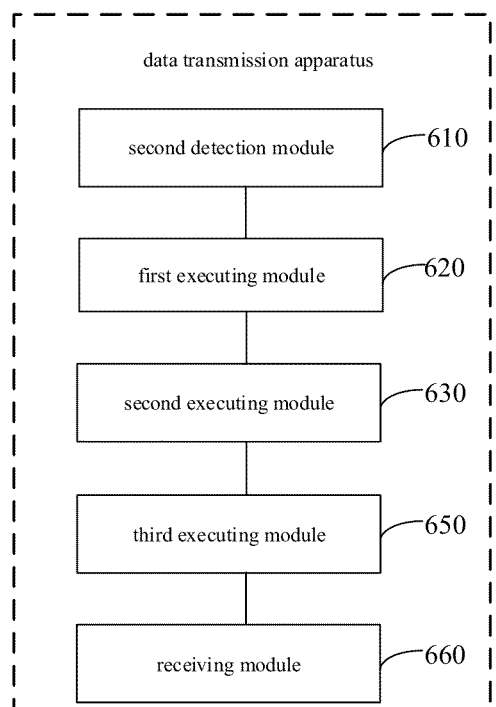
FIG. 18 is a block diagram illustrating another data transmission apparatus according to an exemplary embodiment.

Referring to FIG. 18, FIG. 18 is a block diagram of another data transmission apparatus illustrated on the basis of an embodiment shown in FIG. 14, where the apparatus also includes:

a third executing module 650, which is configured to re-allocate a fifth target resource for data reporting to the user equipment after completing the random access process to the user equipment; and a receiving module 660, which is configured to receive the target data sent by the user equipment through the fifth target resource, where the target data is the data that the user equipment needs to report to the base station currently.

Optionally, the third target resource includes all resource units in the resource set; or the third target resource is the second target resource; or the third target resource includes the second target resource and at least one resource unit located after the second target resource in the resource set.

With respect to the apparatus embodiments, they basically correspond to the method embodiments, so the related parts just refer to the description for the parts in the method embodiments. All the apparatus embodiments described above are merely illustrative, where the units described as separate components may be or may not be physically separated, and the component described as an unit may be or may not be a physical unit. That is, they may be located in one place or be distributed onto multiple network units. Part or all of the modules may be selected as needed to achieve the purpose of approaches of the present disclosure. Those skilled in the art may understand and implement without any inventive effort.

Accordingly, the present disclosure also provides a computer-readable storage medium, where the storage medium stores a computer program for performing the data transmission method for the user equipment according to any of the above embodiments.

Accordingly, the present disclosure also provides a computer-readable storage medium, where the storage medium stores a computer program for performing the data transmission method for the base station according to any of the above embodiments.

Correspondingly, the present disclosure also provides a data transmission apparatus, where the apparatus is used for a user equipment, and includes:

a processor; and a memory for storing an instruction executable by the processor;

where the processor is configured to:

detect a current timing advance TA in a target time unit to obtain a detection result, where the target time unit is any time unit preceding a first time unit corresponding to a first target resource, the first target resource is a random access resource unit associated with a second target resource and meeting a specified condition, and the second target resource is any resource unit in a resource set which is pre-allocated to the user equipment by the base station for reporting grant-free data; and send at least one of a random access signal and a target notification message to the base station, if the detection result indicates that the current TA has expired, where the random access signal is used to indicate that the base station needs to reconfigure a new TA for the user equipment and indicate that the base station does not reserve a third target resource for the user equipment any longer, or where the random access signal is used to indicate that the base station needs to reconfigure a new TA for the user equipment, and the target notification message is used to indicate that the base station does not reserve the third target resource for the user equipment any longer, with the third target resource including at least the second target resource.

Figure 19:
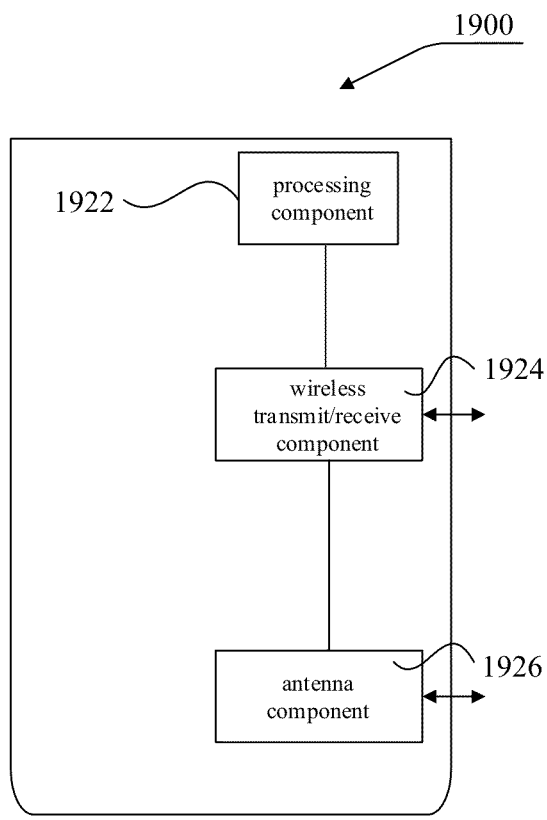
FIG. 19 is a structural schematic diagram for a data transmission apparatus according to an exemplary embodiment of the present disclosure.

As shown in FIG. 19, FIG. 19 is a structural schematic diagram illustrating a data transmission apparatus 1900 according to an exemplary embodiment. The apparatus 1900 may be provided as a user equipment. Referring to FIG. 19, the apparatus 1900 includes a processing component 1922, a wireless transmit/receive component 1924, an antenna component 1926, and a signal processing portion specific to the wireless interface, wherein the processing component 1922 can include one or more processors.

One of the processors in the processing component 1922 can be configured to perform any data transmission method for the user equipment described above.

Correspondingly, the present disclosure also provides a data transmission apparatus, where the apparatus is used for a base station, and includes:

a processor; and a memory for storing an instruction executable by the processor;

where the processor is configured to:

detect whether at least one of the random access signal and the target notification message sent by a user equipment is received, where the random access signal is used to indicate that the base station needs to reconfigure a new TA for the user equipment and indicate that the base station does not reserve the third target resource for the user equipment any longer, or where the random access signal is used to indicate that the base station needs to reconfigure a new TA for the user equipment, and the target notification message is used to indicate that the base station does not reserve a third target resource for the user equipment any longer, with the third target resource including at least a second target resource, and the second target resource being any resource unit in a resource set which is pre-allocated to the user equipment by the base station for reporting grant-free data;

reconfigure and return a new timing advance TA to the user equipment according to the random access signal, if at least one of the random access signal and the target notification message is detected; and no longer reserve a third target resource for the user equipment according to at least one of the random access signal and the target notification message.

Figure 20:
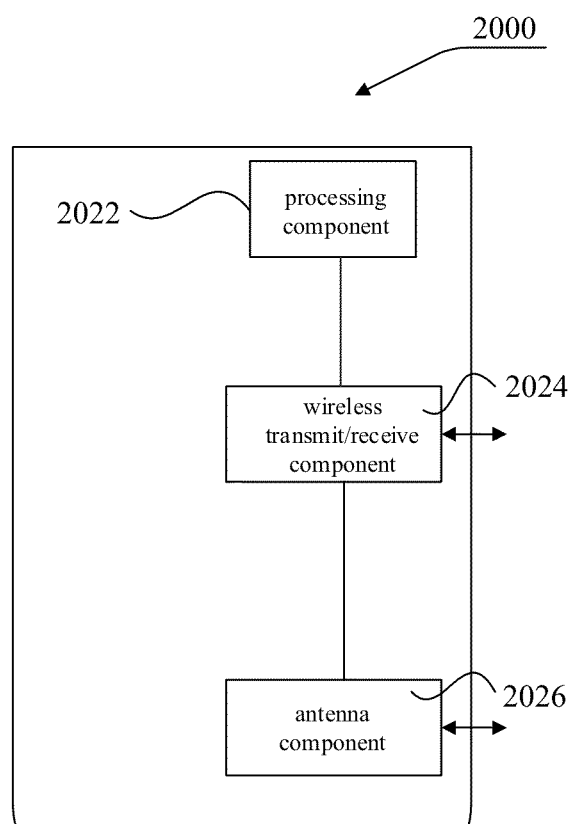
FIG. 20 is a structural schematic diagram for another data transmission apparatus according to an exemplary embodiment of the present disclosure.

As shown in FIG. 20, FIG. 20 is a structural schematic diagram illustrating a data transmission apparatus 2000 according to an exemplary embodiment. The apparatus 2000 can be provided as a base station. Referring to FIG. 20, the apparatus 2000 includes a processing component 2022, a wireless transmit/receive component 2024, an antenna component 2026, and a signal processing portion specific to the wireless interface, wherein the processing component 2022 can include one or more processors.

One of the processors in the processing component 2022 can be configured to perform any data transmission method for the base station as described above.

According to the present disclosure, a user equipment can detect in advance whether a current TA is expired, and when the current TA has expired, a base station configures a new TA for the user equipment, and the base station no longer reserves a third target resource for the user equipment, thereby saving on resources in the Internet of Things.

Other embodiments of the present disclosure will be apparent to those skilled in the art from consideration of the specification and practice of the invention disclosed herein. The present application is intended to cover any variations, uses, or adaptations of the present disclosure following the general principle thereof and including such departures from the present disclosure as come within known or customary practice in the art. It is intended that the specification and examples be considered as exemplary only, with a true scope and spirit of the present disclosure being indicated by the following claims.

It is to be understood that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for data transmission, applied to a user equipment and comprising:

detecting a current timing advance (TA) in a target time unit to obtain a detection result, wherein the target time unit is a time unit preceding a first time unit corresponding to a first target resource, the first target resource is a random access resource unit associated with a second target resource and meeting a specified condition, and the second target resource is a resource unit in a resource set which is pre-allocated to the user equipment by a base station for reporting grant-free data; and sending at least one of a random access signal and a target notification message to the base station, in response to that the detection result indicates that the current TA has expired, wherein the random access signal is configured to indicate that the base station needs to reconfigure a new TA for the user equipment and to indicate that the base station does not reserve a third target resource for the user equipment, or wherein the random access signal is configured to indicate that the base station needs to reconfigure the new TA for the user equipment, and the target notification message is configured to indicate that the base station does not reserve a third target resource for the user equipment, wherein the third target resource comprises at least the second target resource.

2. The method according to claim 1, wherein
the specified condition comprises a time unit, wherein the first target resource precedes a time unit where the second target resource is located; and
the specified condition comprises a target difference that is minimal, or a target difference value that is minimal and also greater than or equal to a preset value, wherein the target difference is a difference value between a time unit number of a time unit where the first target resource is located and a time unit number of a time unit where the second target resource is located.

3. The method according to claim 1, further comprising:
in response to that the random access signal is configured to indicate that the base station needs to reconfigure the new TA for the user equipment and to indicate that the base station does not reserve a third target resource for the user equipment, determining that the random access signal is a first specified random access preamble pre-allocated to the user equipment by the base station.

4. The method according to claim 3, wherein the sending at least one of the random access signal and the target notification message to the base station comprises:
sending, by the first target resource, a first random access signal to the base station, wherein the first random access signal comprises the first specified random access preamble.

5. The method according to claim 1, wherein
the random access signal is a second specified random access preamble which is pre-allocated to the user equipment by the base station, and the target notification message is preset identification information in response to that the random access signal is configured to indicate that the base station needs to reconfigure a new TA for the user equipment, and the target notification message is configured to indicate that the base station does not reserve a third target resource for the user equipment; and
the preset identification information is cell radio network identification information which is pre-allocated to the user equipment by the base station.

6. The method according to claim 5, wherein the sending at least one of the random access signal and the target notification message to the base station comprises:
sending, by the first target resource, a first random access signal to the base station, wherein the first random access signal comprises the second specified random access preamble; and
sending, by a fourth target resource, the second random access signal to the base station, wherein the second random access signal comprises the preset identification information, and the fourth target resource is a resource which is allocated by the base station to the user equipment for carrying the second random access signal during a random access process to the user equipment.

7. The method according to claim 6, wherein
the second random access signal comprises target data, and the target data comprises data that the user equipment needs to report to the base station currently.

8. The method according to claim 1, also comprising:
acquiring a fifth target resource, wherein the fifth target resource is a resource which is re-allocated by the base station to the user equipment for data reporting after a random access process is complete between the user equipment and the base station; and
sending, by the fifth target resource, a target data to the base station based on the new TA, wherein the target data comprises data that the user equipment needs to report to the base station currently.

9. The method according to claim 1, wherein
the third target resource comprises all resource units in the resource set; or
the third target resource comprises the second target resource; or
the third target resource comprises the second target resource and at least one resource unit located after the second target resource in the resource set.

10. A method for data transmission, applied to a base station and comprising:
detecting whether at least one of a random access signal and a target notification message sent by a user equipment is received, wherein the random access signal is configured to indicate that the base station needs to reconfigure a new Timing Advance (TA) for the user equipment and to indicate that the base station does not reserve a third target resource for the user equipment, or wherein the random access signal is configured to indicate that the base station needs to reconfigure the new TA for the user equipment, and the target notification message is configured to indicate that the base station does not reserve a third target resource for the user equipment, wherein the third target resource comprises at least a second target resource, and the second target resource is a resource unit in a resource set which is pre-allocated to the user equipment by the base station for reporting grant-free data;
reconfiguring and returning a new timing advance (TA) to the user equipment according to the random access signal, in response to that at least one of the random access signal and the target notification message is detected; and
no longer reserving the third target resource for the user equipment according to at least one of the random access signal and the target notification message.

11. The method according to claim 10, wherein in response to that the random access signal is configured to indicate that the base station needs to reconfigure the new TA for the user equipment and to indicate that the base station does not reserve the third target resource for the user equipment, the random access signal is a first specified random access preamble pre-allocated to the user equipment by the base station.

12. The method according to claim 11, wherein the detecting whether at least one of the random access signal and the target notification message sent by the user equipment is received comprises:
detecting whether the first specified random access preamble sent by the user equipment through a first random access signal is received or not on a first target resource, wherein the first target resource is a random access resource unit associated with a second target resource and meeting a specified condition.

13. The method according to claim 12, wherein the specified condition comprises a time unit, wherein the first target resource precedes a time unit where the second target resource is located, and a target difference is minimal, or a target difference value is minimal and also greater than or equal to a preset value, wherein the target difference is a difference value between a time unit number of a time unit where the first target resource is located and a time unit number of a time unit where the second target resource is located.

14. The method according to claim 10, wherein in response to that the random access signal is configured to indicate that the base station needs to reconfigure a new TA for the user equipment, and the target notification message is configured to indicate that the base station does not reserve the third target resource for the user equipment, the random access signal is a second specified random access preamble which is pre-allocated to the user equipment by the base station, and the target notification message is preset identification information; and the preset identification information is cell radio network identification information which is pre-allocated to the user equipment by the base station.

15. The method according to claim 14, wherein the detecting whether at least one of the random access signal and the target notification message sent by the user equipment is received comprises:

detecting whether the first specified random access preamble sent by the user equipment through a first random access signal is received or not on a first target resource, wherein the first target resource is a random access resource unit associated with a second target resource and meeting a specified condition; and detecting whether the preset identification information sent by the user equipment through a second random access signal is received or not on a fourth target resource, wherein the fourth target resource is a resource which is allocated by the base station to the user equipment for carrying the second random access signal during a random access process to the user equipment.

16. The method according to claim 15, further comprising:

acquiring the target data in the second random access signal, wherein the second random access signal comprises target data, and wherein the target data comprises data that the user equipment needs to report to the base station currently.

17. The method according to claim 10, further comprising:

re-allocating a fifth target resource to the user equipment for data reporting after completing a random access process to the user equipment; and receiving the target data sent by the user equipment through the fifth target resource, wherein the target data comprises data that the user equipment needs to report to the base station currently.

18. The method according to claim 10, wherein the third target resource comprises all resource units in the resource set;

the third target resource comprises the second target resource; or the third target resource comprises the second target resource and at least one resource unit located after the second target resource in the resource set.

19. An apparatus, comprising:

one or more processors; and a non-transitory computer-readable storage medium, configured to store instructions executable by the one or more processors to perform steps of the method according to claim 10.

20. An apparatus comprising:

one or more processors; and a non-transitory computer readable storage medium, configured to store instructions executable by the one or more processors, wherein the one or more processors are configured to:

detect a current timing advance (TA) in a target time unit to obtain a detection result, wherein the target time unit is a time unit preceding a first time unit corresponding to a first target resource, the first target resource is a random access resource unit associated with a second target resource and meeting a specified condition, and the second target resource is a resource unit in a resource set which is pre-allocated to the user equipment by a base station for reporting grant-free data; and send at least one of a random access signal and a target notification message to the base station, in response to that the detection result indicates that the current TA has expired, wherein the random access signal is configured to indicate that the base station needs to reconfigure a new TA for the user equipment and to indicate that the base station does not reserve a third target resource for the user equipment, or wherein the random access signal is configured to indicate that the base station needs to reconfigure the new TA for the user equipment, and the target notification message is configured to indicate that the base station does not reserve a third target resource for the user equipment, wherein the third target resource comprises at least the second target resource.

* * * * *